United States Patent [19]

Kerr et al.

[11] Patent Number: 5,637,356
[45] Date of Patent: Jun. 10, 1997

[54] POLYESTERS, POLYESTER/ACRYLIC DISPERSIONS, AND APPLICATION THEREOF

[75] Inventors: Ronald J. Kerr; John P. Petrovich, both of Greenville, S.C.; Stephen J. Walker, Marengo, Ill.; J. Alvin Binkley, Travelers Rest, S.C.

[73] Assignee: Morton International, Inc., Chicago, Ill.

[21] Appl. No.: 611,230

[22] Filed: Mar. 5, 1996

[51] Int. Cl.⁶ .............................. B05D 3/02; C08G 63/54
[52] U.S. Cl. ............... 427/386; 528/272; 528/288; 528/295.3; 528/295.5; 528/296; 528/297; 528/301; 528/302; 528/303; 528/307; 525/437; 525/438; 525/444.5; 525/445; 525/447; 525/448; 525/449; 524/600; 524/601; 524/602; 524/604; 524/608; 427/340; 427/372.2; 427/385.5; 427/386
[58] Field of Search .................................. 528/272, 288, 528/295.3, 295.5, 296, 297, 301, 302, 303, 305, 307; 525/437, 438, 444.5, 445, 447, 448, 449; 524/600, 601, 602, 604, 608; 427/340, 372.2, 385.5, 386

[56] References Cited

U.S. PATENT DOCUMENTS

| | | |
|---|---|---|
| 3,546,008 | 12/1970 | Shields et al.. |
| 3,563,942 | 2/1971 | Heiberger. |
| 3,666,704 | 5/1972 | Keppler et al.. |
| 3,734,874 | 5/1973 | Kibler et al.. |
| 4,148,779 | 4/1979 | Blackwell et al.. |
| 4,179,414 | 12/1979 | Clayton. |
| 4,226,752 | 10/1980 | Erickson et al.. |
| 4,233,196 | 11/1980 | Sublett. |
| 4,299,933 | 11/1981 | McConnell et al.. |
| 4,426,482 | 1/1984 | Kuramoto et al.. |
| 4,539,361 | 9/1985 | Siol et al.. |
| 4,546,160 | 10/1985 | Brand et al.. |
| 4,668,730 | 5/1987 | Lovine et al.. |
| 4,725,500 | 2/1988 | Yanai et al.. |
| 4,826,631 | 5/1989 | Sullivan. |
| 4,943,602 | 7/1990 | Brueckmann et al.. |
| 4,946,932 | 8/1990 | Jenkins. |
| 4,977,191 | 12/1990 | Salsmans. |
| 4,990,593 | 2/1991 | Blount. |
| 5,340,870 | 8/1994 | Clinnin et al.. |

*Primary Examiner*—Samuel A. Acquah
*Attorney, Agent, or Firm*—Wayne E. Nacker; Gerald K. White

[57] ABSTRACT

Polyesters are formed from diols and dibasic carboxylic acids at an OH/COOH ratio to provide —OH termination, and then end-capped with tribasic carboxylic acids. A major portion of the dibasic carboxylic acids used to form the polyesters have the formula:

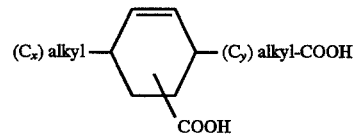

where x=8–32, y=0–8, x+y=8–32. The polyesters are used as support resins for forming acrylic resin emulsions. The polyester/acrylic acid emulsions are useful, for example, as textile size.

20 Claims, No Drawings

POLYESTERS, POLYESTER/ACRYLIC DISPERSIONS, AND APPLICATION THEREOF

The present invention is directed to novel polyesters, dispersions in which the novel polyesters are used as support resins for emulsion-polymerized acrylic resins and to uses of such polyester/acrylic dispersions, such uses include textile sizing and binders, graphic arts ink and overprints, coatings, contact adhesives, etc.

BACKGROUND OF THE INVENTION

While the present invention has a number of useful applications, one important application for which the polyester/acrylic emulsions in accordance with the invention were developed is textile sizing.

One popular type of textile slasher dyeing size is a polyester resin which is cross-linked with melamine resin. Such size is sold, for example, as Eastman WD. Melamine resin contains a certain level of free formaldehyde, and formaldehyde is generated and released during the cross-linking reaction, a chemical considered a hazard.

Among other aspects of the present invention, there is provided an aqueous polyester/acrylic dispersion useful as a size which requires no curing, such as with melamine resin. Further, the size is intended to remain with the textile, providing the textile with both water- and solvent- resistance.

SUMMARY OF THE INVENTION

In accordance one aspect of the invention there is provided a polyester, designated "A)" herein, containing monomers which are diacids having a cyclohexene ring. In particular, polyester A) comprises between about 10 and about 50, preferably between about 25 and about 35 weight percent of diacids having a cyclohexene ring. Polyester A) has terminal carboxylic acid functionality providing polyester A) with an acid number of between about 60 and about 280, preferably between about 175 and about 225.

In accordance with another aspect of the invention there is provided a polyester, designated "B)" herein, comprising between about 10 and about 50, preferably between about 25 and about 35, weight percent of a monomer which is a diacid having a cyclohexene ring and further between about 1 and about 20, preferably between about 3 and 6, weight percent of a monomer having monohydroxy, monoamine functionality. Polyester B) has terminal carboxylic acid functionality providing polyester B) with an acid number of between about 60 and about 280, preferably between about 125 and about 175.

In accordance with another aspect of the invention, a polyester adduct designated "C)", "C(A))" or "C(B))", comprises either polyester A) or polyester B), respectively, partially esterified with an internal surfactant designated "D)" which comprises a polyester in which a terminal alkyl, aryl, or alkylaryl phenol moiety is linked to a polyalkylene oxide chain.

In accordance with a further aspect of the invention, polyester A), polyester B) or polyester adduct C) is a support for an emulsion-polymerized acrylic resin. Depending upon the monomers used in forming the acrylic resin, the resulting polyester/acrylic emulsion may be used as a textile size, coating, adhesive, or in graphic art inks and overprints.

The invention is further directed to polyester/acrylic dispersions incorporating particular functionality in the acrylic resin.

DETAILED DESCRIPTION OF CERTAIN PREFERRED EMBODIMENTS

Herein, unless otherwise noted, percentages are in weight percent. In emulsions in accordance with the invention, the polyester and/or polyester portion of a polyester/surfactant adduct plus acrylic resin are considered to total 100%. Relative to the total weight of the polyester/acrylic resins of the emulsions described herein, other components of compositions (including surfactant portions of polyester/surfactant adducts) are expressed in weight percents calculated relative to the total of polyester and acrylic.

The polyesters of the present invention are the condensation products of diacids, triacids, diols, and in some cases (polymer B) monomers, such as ethanol amine, having mono hydroxy, mono amine functionality. The polyesters are formed in a conventional manner by condensation of the monomers in the presence of heat and with water removal.

Polymer A) in accordance with the present invention is formed from dibasic acids, diols, and tribasic acids. In accordance with the invention, at least 60 wt%, preferably at least 80 wt% up to 100 wt% of the dibasic acid content is a hexenyl group-containing dibasic acid of the general formula:

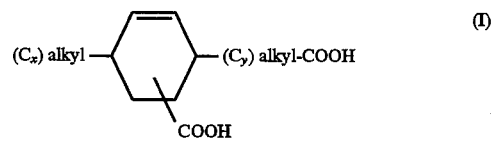

(I)

where x=8–32, y=0–8, and x+y=8–32.

Such dibasic acids are formed by a Diels-Alder reaction of acrylic acid and a long-chain fatty acid having conjugated ethylenic unsaturation. Such dibasic acids are sold by Westvaco as Westvaco® Diacids 1550 and 1575. These are dimers of acrylic acid and tall oil. Tall oil is a mixture of $C_{18}$–$C_{21}$ fatty acids, such as oleic acid and linoleic acid, in which the alkyl chains in accordance with formula (I) above are generally linear. If the hexenyl group-containing dicarboxylic acid is not the sole dicarboxylic acid used in forming the polyester, up to about 40 wt %, preferably not more than about 20 wt %, may be other dicarboxylic acids, such as succinic acid, itaconic acid, adipic acid, azelaic acid, and maleic anhydride.

The diol component of polyester A) is used at a level such that the hydroxyl content of the diol is in excess of the carboxylic acid content of the dicarboxylic acid content, i.e., at an OH/COOH ratio of between about 1.5 to about 2.5, whereby the polyester, exclusive of the tricarboxylic acid, would be —OH-terminated. It is preferred that at least about 60 weight percent, up to about 95 weight percent, of the diol content be a diol which provides somewhat hindered —OH groups, whereby the polyester which forms is resistant to subsequent hydrolysis. Examples of such diols include, but are not limited to cyclohexane dimethanol, neopentyl glycol, and cyclohexanediol, cyclohexane dimethanol being a currently preferred diol. A minor portion, i.e. between about 5 and about 40 wt %, of the diol content comprises diol(s) having primary, un-hindered —OH groups, such as ethylene glycol, diethylene glycol, 1,4-butanediol, 1,6-hexanediol and the like.

The tribasic carboxylic acid is provided in amounts sufficient to end-cap the polyester, thereby providing substantial carboxylic acid functionality to the polymer. (Carboxylic anhydride functionality is considered herein to be the equivalent of two carboxylic acid functions, as the anhydride ring hydrolyzes and opens either during polyester formation or when the polyester is dissolved in aqueous medium.) Thus, the polyester A) is substantially linear with tetracarboxylic acid functionality, i.e., dicarboxylic acid functionality at both termini. The polyester may be formed by first reacting the dibasic carboxylic acid monomers with the diol monomers to produce an —OH-terminated polyester and thereafter end-capping the polyester with the tribasic carboxylic acid. This may be done in one pot, however, by adding the tribasic carboxylic acid at the end of the reaction. By end-capping with the tribasic acid, e.g., trimellitic anhydride, a substantially linear, rather than a significantly branched, polyester, is formed.

Polyester B) is a variation of Polyester A) in which a portion, i.e., between about 25 and about 100, preferably between about 40 and about 60 mole percent and most preferably between about 45 and about 50 mole percent, of the dicarboxylic acid is pre-reacted with a monomer having monohydroxyl, monoamine functionality. Typically, it is all or a portion of the cyclohexenyl group-containing dicarboxylic acid which is pre-reacted with the hydroxy/amine monomer. A convenient hydroxy/amine monomer is ethanol amine. When a hydroxy/amine monomer is used, the resulting amide bonds improve adhesion to substrates, e.g., for use in laminating inks. Also, amide bonds enhance wetting of films. When reacted with a dicarboxylic acid, the amine group reacts greatly preferentially, relative to the hydroxyl group, with the carboxylic acid functionalities, thereby producing dimers having mono-carboxylic, mono-hydroxy functionality and/or trimers having di-hydroxy functionality. These pre-reacted species are then reacted with any remaining dicarboxylic acid plus diol and then end-capped with the tribasic carboxylic acid.

Because monohydroxy, monoamine monomers have effective carboxylic acid functionalities of 2, the hydroxy/amine monomer in polyester B) replaces a corresponding molar amount of diol of polyester A). Again, however, the diol plus hydroxy/amine monomer are provided, in total, to provide an excess of functionality (amine plus hydroxy) relative to the carboxylic acid functionality, i.e., between about a 1.5 and about a 2.5 (hydroxyl plus amine)/carboxylic acid functionality) excess, whereby the polyester, exclusive of the tribasic carboxylic acid, would be OH-terminated. Again, tribasic carboxylic acid is used to end-cap the polyester, providing tetracarboxylic acid functionality to the polyester.

Polyesters A) or B) are generally short-chain having weight average molecular weights (Mw) of between about 500 and about 1500, typically 1000–1100. Acid numbers of the polyester range from about 100 to about 240, typically between about 185 and 190.

In accordance with a further aspect of the invention either polyester A) may be adducted with an internal surfactant D) to form an adduct C(A)) or polyester B) may be adducted with internal surfactant D) to form adduct C(B)). The polyester (including not only adducted polyester chains, but any non-adducted polyester chains as well) comprises between about 70 and 80 wt % of the adduct; the internal surfactant between about 20 and about 30 wt % of the adduct. The internal surfactant D) is the reaction product of an alkyl, aryl or alkylaryl phenol with alkylene oxide, the internal surfactant having a hydroxyl group at one end of the relatively hydrophilic alkylene oxide chain and the hydrophobic moiety provided by the phenol at the other end.

Suitable alkyl-, aryl-, or alkylaryl- substituted phenols for forming the internal surfactant D) include, but are not limited to octylphenol, nonylphenol and tristyrylphenol. The polyalkylene oxide portion of the internal surfactant is typically a chain of between about 4 and about 50 alkylene oxide units, preferably at least 8 alkylene oxide units, at least about half, up to all, of which are ethylene oxide units. If other alkylene oxide units are present, they are generally propylene oxide units. The substituted phenol moiety typically comprises between about 20 and about 45 weight percent of the internal surfactant D); the polyalkyleneoxide chain typically between about 55 and about 80 weight percent.

When adducting internal surfactant D) to either polyester A) or polyester B), the amount of internal surfactant D) is added in amounts to esterify between about 15 and about 40 weight percent of the available carboxylic acid sites, most of which are at the termini of the polyester chains. Preferably, sufficient internal surfactant D) is adducted with the polyester (A) or B)) such that when polymerizing an acrylic resin, no additional surfactant need be added. Thus, the acid numbers of adduct C(A)), and C(B)) are each typically reduced to between about 50 and about 150, preferably between about 85 and about 110.

Acidic polyester A) and B) in accordance with the invention as well as adducts C(A)) and C(B)) must be at least partially neutralized to be sufficiently soluble in water to act as support resins for acrylic polymers. Accordingly, solutions of the polyesters A) or B) or polyester/internal surfactant adducts C(A)) or C(B)) are generally neutralized in aqueous solution to a pH of about 6.5 or above. Neutralization is preferably carried out with ammonia which adds no volatile organic content (VOC), although amines can also be used for neutralization.

Polyesters A) and B), as well as adducts C(A)) and C(B)) are importantly used as support resins for emulsion polymerization of acrylic resins. Herein, acrylic resins are broadly defined to define resins which include not only acrylic monomers, but other $\alpha,\beta$-ethylenically unsaturated comonomers, such as styrene. Examples of suitable acrylic acids and acrylic acid esters used for forming the acrylic polymer include, but are not limited to acrylic acid, methacrylic acid, methyl methacrylate, ethyl acrylate, butyl acrylate, methyl acrylate, ethyl methacrylate, butyl methacrylate, 2-hydroxyethyl acrylate, 2-hydroxyethyl methacrylate, butyl acrylate, propyl methacrylate, lauryl methacrylate, 2-hydroxypropyl methacrylate, 2-ethyl hexyl methacrylate, hexyl methacrylate, cyclohexyl methacrylate, ethoxyethyl acrylate, ethyl acrylate, cyclohexyl acrylate, hexyl acrylate, 2-hydroxypropyl acrylate, and acetyl acetoxy ethyl methacrylate. In accordance with an aspect of the invention to be discussed in greater detail, hereinafter; acrylic monomers providing epoxy functionality, such as glycidyl methacrylate (GMA) and/or amine functionality, such as dimethyl amino ethyl methacrylate (DMEMA) may also be used. Some examples of suitable co-polymerizeable monomers include styrene, $\alpha$-methyl styrene, vinyl toluene, vinyl pyrrolidine, acrylonitrile, butadiene and isoprene.

The polyesters A) or B) are used as support resins for emulsion polymerization of acrylic resins. If adducted to internal surfactant D) to form adducts C(A)) or C(B)), generally no external surfactant is required to support a stable dispersion. However, if either polyester A) or B) is used alone (without adducting to an internal surfactant), it is generally desired or necessary to add additional surfactant. The external surfactant may be an anionic surfactant, such as a fatty acid sulfate, and/or a non-ionic surfactant, such as an ethylene oxide/propylene oxide block copolymer (EOPO) in an amount sufficient to stabilize an emulsion. Typically, external surfactant will be added at levels of between about 1 and about 10, preferably between about 2 and about 4 weight percent calculated relative to the total weight of the polyester support resin plus the acrylic resin that is to be formed. Some suitable commercial surfactants are Antarox® L-64 and Makon® NF-12.

To form the polyester/acrylic emulsions of the present invention, the acrylic monomers and free-radical initiators are charged to an aqueous solution containing the (at least partially neutralized) polyester or polyester/internal surfactant adduct and any necessary external surfactant. Polymerization of the acrylic monomers and other $\alpha,\beta$-ethylenically unsaturated comonomers is by conventional means, such as taught, for example, in U.S. Pat. Nos. 5,340,870, 4,826,631, 3,666,704, 4,179,414, 4,226,752, 4,426,482, 4,539,361, 4,546,160, and 4,668,730, the teachings of each of which are incorporated herein by reference.

The emulsion polymerization of the acrylic monomers produces an aqueous emulsion of polyester resin/acrylic resin particulates. The polyester resin/acrylic resin emulsion is generally formulated to contain between about 10 and about 70, preferably between about 30 and about 60, weight percent polyester resin and between about 30 and about 90, preferably between about 40 and about 70, weight percent acrylic resin based on the total of polyester resin plus acrylic resin, and exclusive of internal surfactant D) if polyester adduct C(A)) or C(B)) is used.

The polyester resin/acrylic resin emulsions in accordance with the invention appear to be materially different than an emulsion which might be formed by adding an pre-formed acrylic latex to an aqueous polyester solution. Indications are that there is substantial interaction between the polyester resin and the acrylic resin. This may be merely physical, e.g., by intertwining of the polymer chains. However, there may be some degree of chemical bonding, e.g., through the unsaturated bond of the cyclohexene ring and the acrylic resin which is formed. Evidence of material interaction between the polyester and the acrylic resins is that when the emulsion is applied to a substrate and dried, the polyester resin component cannot be washed away with aqueous solutions.

An unexpected advantage of the present invention is that very small, i.e., typically less than about 0.1 micron, preferably less than about 0.08 micron, in diameter, very uniform size, dispersed particulates are formed. By uniform is meant that about 90% of the particulates have diameters within 20% of each other. Small, uniform particulates provide potential utility for certain exacting applications, such as support resins for immuno-assays.

The monomers used to form the acrylic resin are selected according to desired end-uses of the polyester resin/acrylic resin emulsion. The glass transition temperature ($T_g$) can be selected by appropriate monomer selection, as is known in the art. Styrene and substitute styrenes tend to produce higher Tgs; acrylates, particularly long chain alkyl acrylates, tend to produce lower $T_g$s. Also, monomers are selected to provide desired functional groups on the acrylic resin. Acrylic acid and methacrylic acid provide carboxylic functionality. Acid functionality may also be provided, for example, by acetyl acetoxy ethyl methacrylate. Hydroxyl functionality may be provided, for example, by 2-hydroxyethyl acrylate, 2-hydroxyethyl methacrylate, 2-hydroxypropyl acrylate, 2-hydroxypropyl methacrylate, etc.

Polyester/acrylic dispersions in accordance with the invention provide high gloss and rapid drying, properties which are advantageous in a number of applications; including graphic arts, textile slasher/sizing baths, and coating. The dispersions are stable, facilitating their use in applications such as slasher/sizing baths.

One very important utility of polyester/acrylic resins in accordance with the invention is as a textile size. For textile size, the acrylic resin should have a hydroxyl number of between about 25 and about 200, preferably between about 75 and about 125, an acid number of between about 1 and about 20, preferably between about 1 and about 10, and a $T_g$ of between about 1° and about 30° C. The $T_g$ is important because if too low, the yarn can't be woven due to tackiness of the size; if too high, the size will flake off. Size in accordance with the invention has the further advantage of remaining on the fiber, unlike conventional size, and may also serve as binder for pigments etc. The size on the fiber provides water resistance, and sufficient resistance to chemicals, such as 1,1,1-trichloroethylene, that the size remains on the fabric when dry-cleaned.

Textile sizing is done in a conventional manner. Warp threads are passed through a sizing/slasher bath containing the polyester/acrylic dispersion, typically at about a 3 to about an 8 wt % solids levels, plus other solids, such as pigments (typically at levels of 0.1 to 8%), and conventional sizing/slasher bath additives such as anti-static agents, lubricants and anti-migrants. The threads are then pressed and dried. Heating to the range of about 107°–117° C. helps to bond the size permanently to the fibers, although the nature of the change to the polyester/acrylic dispersion is not fully understood.

Another important use for the polyester/acrylic dispersions of the present invention is in graphic arts applications. In such an application, little or no hydroxyl or carboxylic acid functionality is desired. $T_g$s for graphic arts applications may range from about 0° to about 80° C., preferably between about 30° and about 50° C. The dispersions in accordance with the present invention provide drying speed and gloss equivalent to solventbased coatings. Furthermore, they provide excellent wetting of the substrate.

Another important aspect of the present invention is the ability to incorporate high amounts of epoxy-functional monomer into the acrylic resin. Typically, water-borne acrylic formulations tend to gel when the epoxy-functional monomer exceeds about 3 wt %. Herein, it is found that when using the support polyesters A) and B) of the present invention, or the internally plasticized adducts C(A)) and C(B)), up to 30 wt % epoxy functional monomer, such as glycidyl methacrylate can be incorporated in the acrylic resin. The epoxy functionality serves as a self-cross-linking agent. While cross-linking is meaningful when epoxy-functional monomer is present at levels as low as 1 wt % of the acrylic resin, preferably the epoxy functional monomers are present at about 5 wt % or above, more preferably at about 10 wt % or above, as a component of the acrylic resin. Epoxy equivalent weights (EEWs) of self-curing acrylic resins in accordance with the present invention range from about 500 to about 2500. When an epoxy-functional polyester/acrylic dispersion in accordance with the invention is coated onto a substrate, such as metal or wood, and dried, auto-curing begins at room temperature. At higher temperatures, curing is much faster, and epoxy-functional polyester/acrylic dispersions in accordance with the invention may cure sufficiently rapidly for use as the binder resin in metal coil coating compositions.

Also, surprisingly, using the polyester support resins of the invention, it is possible to incorporate amine-functional, i.e., secondary and tertiary amine-functional, monomers in the acrylic resin along with epoxy-functional monomers without gelling. While the upper limits of epoxy-functional monomer is reduced when amine-functional monomers are also incorporated, acrylic resins having between about 1 and about 10 wt % epoxy-functional monomer along with between about 1 and about 10 wt % amine-functional monomer may be stably supported by the polyester support resins of the present invention. Again, the rapid cure provided by such resins promotes their use in coil coating compositions.

The invention will now be described in greater detail by way of specific examples.

EXAMPLE 1

A polyester and polyester solution in accordance with the invention were prepared.

| Material | Weight % |
| --- | --- |
| Diacid 1550 (tall oil fatty acid/acrylic acid Diels-Alder product) | 28.65 |
| Cyclohexane dimethanol (CHDM-D) | 24.78 |
| Diethylene glycol (DEG) | 5.75 |
| Trimellitic anhydride (TMA) | 40.82 |
| | 100.00 |

(water loss 4.30 wt %)

Diacid 1550 and CHDM-D were pre-heated to 65° C. Diacid 1550, CHDM-D, and DEG were charged into a reactor and heated to 95° C. TMA was then added with mixing and the mixture was heated to 130° C. with surface nitrogen sparge on the reactor. The reaction mixture was held at 130° C. for 30 minutes. The nitrogen was turned off and the reaction mixture placed under vacuum of 200 mm. Hg and brought to 180° over 2.5-3 hours. Vacuum and temperature were maintained there at for an hour, and then the batch was cooled. At 160°, the vacuum was released to nitrogen, and the resulting polyester was then cooled to 130° C. The acid number of the polyester was 188 and had a Reduced Viscosity of W to X (Gardner-bubble tube viscosity in 50 wt % n-methyl pyrrolidone).

The aqueous solution of the polyester was prepared containing 41.85 wt % of the polyester, 50.65 wt % deionized water and 7.50 wt % 28% ammonia. The water and ammonia were pre-heated to 55° C. and the dilute ammonia solution was rapidly added to the polyester at 130° C. The solution was mixed at 85° C. for three hours to completely solubilize the polyester. pH was adjusted to 7.0; solids to 40 wt %. The solution had a viscosity of 400 cps at 25° C.

EXAMPLE 2

A polyester/acrylic dispersion in accordance with the invention was produced by polymerizing an acrylic resin in an aqueous solution containing the polyester of Example 1. The components for producing the dispersion are as follows:

| Material | wt % |
| --- | --- |
| 1. Polyester solution from Example 1 | 30.41 |
| 2. Deionized water | 31.04 |
| 3. Abex ® (surfactant) | 1.87 |
| To catalyst tank | |
| 4. Deionized water | 1.40 |
| 5. Ammonium persurlfate (initiator) | 0.144 |
| To monomer tank | |
| 6. Styrene | 8.90 |
| 7. Butyl acrylate | 10.92 |
| 8. Methyl methacrylate | 3.55 |
| 9. Hydroxy ethyl methacrylate | 6.08 |
| 10. Methacrylic acid | 0.18 |
| 11. Makon ® NF-12 (non-ionic surfactant) | 0.47 |
| 12. Antarox ® L-64 (non-ionic surfactant) | 0.47 |
| Delayed initiator feed | |
| 13. Deionized water | 1.87 |
| 14. Ammonium persulfate | 0.18 |
| Neutralization | |
| 15. Deionized water | 1.55 |
| 16. Ammonia (28%) | 0.24 |
| Biocide | |
| 17. Deionized water | 0.62 |
| 18. Proxel ® GXL | 0.048 |

Components (1), (2), and (3) were charged to a reactor and heated to 80° C. with nitrogen sparge and agitation. Components (6) through (12) were charged to a monomer weigh tank and mixed well for 30 minutes. Ammonium sulfate (5) was dissolved in water (4) and this solution was added to the reactor held at 80° C.; the nitrogen sparge was ended. Immediately, monomer mix add begin, and the monomer was added incrementally over 150 minutes total, during which time the temperature was maintained at 78°–80° C. Ammonium persulfate (14) was dissolved in water (13) and the solution was added to the reactor after the first 30 minutes of monomer mix addition. After the monomer/catalyst additions, the reaction mixture was held at 80–82° C. for two hours. The reaction mixture was cooled to 50° C. and neutralized by addition of components (15) and (16). Components (17) and (18) were added when the reaction mix cooled to below 40° C. The polyester resin/acrylic resin dispersion was filtered through a 120 U.S. Mesh filter bag.

The dispersion is useful as a slasher dyeing textile size.

EXAMPLE 3

In this example, a polyester containing amide bonds is prepared, adducted to a surfactant, and solubilized in water.

| Material | Weight % |
| --- | --- |
| Diacid 1550 (tall oil fatty acid/acrylic acid Diels-Alder product) | 29.46 |
| Cyclohexane dimethanol (CHDM-D) | 17.03 |
| Diethylene glycol (DEG) | 5.22 |
| Ethanol amine | 4.81 |
| Trimellitic anhydride (TIXA) | 43.48 |
| | 100.00 |
| Soprophors BSU (surfactant)* | 34.86 based on polyester wt. |

*1-poly(oxy-1,2-ethanediyl) hydroxy-tris 2,4,6-(1-phenyl ethyl) benzene (16 unit polyethylene oxide chain terminated with tris 2,4,6-1-phenyl ethyl) phenol Diacid 1550, CHDM-D and DEG were charged to a reactor and agitation was begun. Ethanol/amine was added slowly to the reactor over 3 to 5 minutes, allowing the mixture to exotherm and heat to 90° to 95° C. The mixture was held for 12 minutes. TMA was added, and the reaction mixture was heated to 125° C. under nitrogen. The reaction was held at 125° C. for 30 minutes. The reaction mixture was then placed under vacuum of 200 mm. Hg and the mixture heated to 170° C. over a 2–2.5 hour period. After a 30 minute hold period, vacuum was released with nitrogen and the Soprophor® BSU, which had been preheated to 65° C., was added, dropping the temperature to 150° C. The reaction mixture was again placed under vacuum of 200 mm. Hg and heated to 180° C. over a period of 30–60 minutes. The reaction was held at 180° C. for 2 hours and then cooled to 160° C. while still under vacuum. At 160° C., the vacuum was released with nitrogen. The reaction product is a polyester in accordance with the invention adducted with a surfactant.

The polyester/surfactant adduct has an acid number of about and a reduced viscosity of J to K.

A solution of 40.62 wt % of the polyester/surfactant adduct, 53.73 wt % deionized water and 5.63 wt % of 28% ammonia solution was prepared by adding the adduct while still at 160° C. to the water and ammonia and holding the solution at 85° C. for an hour.

The solution had a pH of 8.10, 40% solids, and a viscosity at 25° C. of 20,000 cps.

EXAMPLE 4

A polyester/acrylic dispersion in accordance with the invention was produced by polymerizing an acrylic resin in an aqueous solution containing the polyester of Example 1. The components for producing the dispersion are as follows:

| Material | wt % |
| --- | --- |
| 1. Polyester solution from Example 1 | 54.12 |
| 2. Deionized water | 8.40 |
| 3. Abex ® 26S | 0.65 |
| To catalyst tank | |
| 4. Deionized water | 2.00 |
| 5. Ammonium persulfate | 0.20 |
| To monomer tank | |
| 6. Styrene | 20.89 |
| 7. 2-ethylhexyl acrylate | 7.82 |
| 8. Methacrylic Acid | 0.59 |
| 9. Butyl mercaptopropionate | 0.12 |
| 10. Antarox ® L-64 | 0.55 |
| 11. Makon ® NF-12 | 0.55 |
| Delayed initiator feed | |
| 12. Deionized water | 3.00 |
| 13. Ammonium persulfate | 0.25 |
| Neutralization | |
| 14. 28% Ammonia | 0.76 |
| Biocide | |
| 15. Deionized water | 0.05 |
| 16. Proxel ® GXL | 0.05 |

Components (1), (2), and (3) were charged to a reactor and heated to 80° C. with nitrogen sparge and agitation. Components (6) through (11) were charged to a monomer weigh tank and mixed well. Ammonium persulfate (5) was dissolved in water (4) and this solution was added to the reactor held at 80° C.; the nitrogen sparge was ended. Immediately, the monomer mix add began, and the monomer was added incrementally over 150 minutes total, during which time the temperature was maintained at 78°–80° C. Ammonium persulfate (13) was dissolved in water (12) and the solution was added to the reactor after the first 30 minutes of monomer mix addition. After the monomer/catalyst additions, the reaction mixture was held at 80°–82° C. for two hours. The reaction mixture was cooled to 55° C. and neutralized by addition of component (14). Components (15) and (16) were added when the temperature was below 40° C. The polyester resin/acrylic resin dispersion was filtered through a 120 U.S. Mesh filter bag. The resulting dispersion has a pH of 8.1, a solids content of 53.6%, with a viscosity of 200 cps.

The dispersion is useful as a graphic arts, high gloss, fast drying overprint.

EXAMPLE 5

A polyester/acrylic dispersion in accordance with the invention was produced by polymerizing an acrylic resin in an aqueous solution containing the polyester of Example 1. The components for producing the dispersion are as follows:

| Material | wt % |
| --- | --- |
| 1. Polyester solution from Example 1 | 31.68 |
| 2. Deionized water | 28.17 |
| 3. Abex ® 26S | 1.95 |
| To catalyst tank | |
| 4. Deionized water | 1.46 |
| 5. Ammonium persulfate | 0.15 |
| To monomer tank | |
| 6. Styrene | 4.64 |
| 7. Butyl acrylate | 19.73 |
| 8. Hydroxyethyl methacrylic | 6.34 |
| 9. Methacrylic acid | 0.19 |
| 10. Antarox ® L-64 | 0.49 |
| 11. Makon ® NF-12 | 0.49 |
| Delayed initiator feed | |
| 12. Deionized water | 1.95 |
| 13. Ammonium persulfate | 0.19 |
| Neutralization | |
| 14. Deionized water | 1.62 |
| 15. 28% Ammonia | 0.25 |
| Biocide | |
| 16. Deionized water | 0.65 |
| 16. Proxel ® GXL | 0.65 |

Components (1), (2), and (3) were charged to a reactor and heated to 80° C. with nitrogen sparge and agitation. Components (6) through (11) were charged to a monomer weigh tank and mixed well. Ammonium persulfate (5) was dissolved in water (4) and this solution was added to the reactor held at 80° C.; the nitrogen sparge was ended. Immediately, the monomer mix add began, and the monomer was added incrementally over 150 minutes total, during which time the temperature was maintained at 78°–80° C. Ammonium persulfate temperature (13) was dissolved in water (12) and the solution was added to the reactor after the first 30 minutes of monomer mix addition. After the monomer/catalyst additions, the reaction mixture was held at 80°–82° C. for two hours. The reaction mixture was cooled to 55° C. and neutralized by addition of components (14) and (15). A mixture of components (16) and (17) was added below 40° C. The polyester resin/acrylic resin dispersion was filtered through a 120 U.S. Mesh filter bag. The resulting dispersion has a pH of 7.7, a solids content of 45.7%, with a viscosity of 180 cps.

The dispersion is useful as a formaldehyde-free, textile binder.

EXAMPLE 6

A polyester/acrylic dispersion in accordance with the invention was produced by polymerizing an acrylic resin in an aqueous solution containing the polyester of Example 3.

The components for producing the dispersion are as follows:

| Material | wt % |
|---|---|
| 1. Polyester solution from Example 3 | 39.70 |
| 2. Deionized water | 2.65 |
| To catalyst tank | |
| 3. Deionized water | 1.59 |
| 4. Ammonium persulfate | 0.24 |
| To monomer tank | |
| 5. Styrene | 7.78 |
| 6. 2-ethylhexyl acrylate | 4.80 |
| 7. Methyl Methacrylate | 8.10 |
| Delayed initiator feed | |
| 8. Deionized water | 3.12 |
| 9. Ammonium persulfate | 0.16 |
| Blend | |
| 10. 25% Filtrez 5014 solution | 31.76 |
| Biocide | |
| 11. Deionized water | 0.05 |
| 12. Proxel® GXL | 0.05 |

Components (1) and (2) were charged to a reactor and heated to 80° C. with nitrogen sparge and agitation. Components (5), (6), and (7) were charged to a monomer weigh tank and mixed well. Ammonium persulfate (4) was dissolved in water (3) and this solution was added to the reactor held at 80° C.; the nitrogen sparge was ended. Immediately, the monomer mix add began, and the monomer was added incrementally over 125 minutes total, during which time the temperature was maintained at 78°–80° C. Ammonium persulfate (9) was dissolved in water (8) and the solution was added to the reactor after the first 30 minutes of monomer mix addition. After the monomer/catalyst additions, the reaction mixture was held at 80°–82° C. for one hour. The reaction mixture was cooled to 60° C. and component (10) was added.

The polyester resin/acrylic resin dispersion was filtered through a 120 U.S. Mesh filter bag. The resulting dispersion has a pH of 8.3, a solids content of 44.9%, with a viscosity of 320 cps.

The dispersion is useful as a graphic arts laminating ink. What is claimed is:

1. A polyester formed of monomers comprising i) dibasic carboxylic acids, ii) tribasic carboxylic acids, and iii) a mixture of iii(a)) diols and iii(b)) monohydroxy, monoamines, said monohydroxy, monoamines iii(b)) comprising between about 1 and about 20 weight percent of the monomers which form said polyester, at least about 60 wt % of said dibasic carboxylic acids i) having the formula:

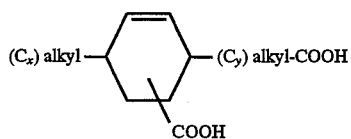

(I)

where x=8–32, y=0–8, x+y=8–32, balance of i) other dicarboxylic acids, said mixture iii) being provided in an amount relative to said dibasic carboxylic acids i) such that the (amine plus OH)/COOH ratio calculated as the amine plus OH content of mixture iii) to the COOH content of i) is between about 1.5 and about 2.5, said tribasic carboxylic acids ii) terminating said polyester, said polyester having an acid number between about 60 and about 280.

2. A waterborne composition comprising I) an aqueous medium containing dispersed particles of II) an acrylic resin and III) the polyester of claim 1, said acrylic resin II) having been emulsion-polymerized in said aqueous medium I) containing said polyester III), said acrylic resin II) comprising between about 30 and about 90 wt % of the total of II) +III), said acrylic resin being polymerized from $\alpha,\beta$-ethylenically unsaturated monomers of which at least about 30 wt % are acrylic monomers, balance, co-monomers, said polyester comprising between about 10 and about 70 wt % of II) +III), said waterborne composition further comprising surfactant in amounts sufficient to maintain a stable dispersion of said particles in said aqueous medium I).

3. A waterborne composition in accordance with claim 2 wherein between about 1 and about 30 wt % of said $\alpha,\beta$-ethylenically unsaturated monomers from which said acrylic resin II) is formed have epoxy functionality.

4. A waterborne composition in accordance with claim 2 wherein between about 1 and about 10 wt % of said $\alpha,\beta$-ethylenically unsaturated monomers from which said acrylic resin II) is formed have epoxy functionality and wherein between about 1 and about 10 wt % of said $\alpha,\beta$-ethylenically unsaturated monomers from which said acrylic resin II) is formed have amine functionality.

5. A polyester/internal surfactant adduct comprising the reaction product of the polyester of claim 1 with an internal surfactant, said internal surfactant comprising between about 55 and about 80 wt % of a polyalkylene oxide chain terminated at one terminus with a hydroxyl group and at the other terminus an alkyl, aryl, or alkylaryl-substituted phenol moiety which comprises between about 20 and about 45 wt % of said internal surfactant, said polyester comprising between about 70 and about 80 wt % of said adduct and said internal surfactant comprising between about 20 and about 30 wt % of said adduct, said adduct having an acid number between about 50 and about 150.

6. A waterborne composition comprising I) an aqueous medium containing dispersed particles of II) an acrylic resin and III) the polyester of claim 1, said polyester III) being adducted with an internal surfactant IV), to form adduct V), said internal surfactant IV) comprising a polyalkylene oxide chain x) terminated at one terminus with a hydroxyl group and at the other terminus an alkyl, aryl, or alkylaryl-substituted phenol moiety xx), said polyalkylene oxide chain x) comprising between about 55 and about 80 wt % of said internal surfactant IV) and said phenol moiety xx) comprising between about 20 and about 45 wt % of said internal surfactant IV), said polyester III) comprising between about 70 and about 80 wt % of said adduct V) of III) and IV) and said internal surfactant IV) comprising between about 20 and about 30 wt % of said adduct V) of III) and IV), said adduct V) of III) and IV) having an acid number between about 50 and about 150, said acrylic resin II) having been emulsion-polymerized in said aqueous medium I) containing said adduct V) of polyester III) and internal surfactant IV), said acrylic resin II) comprising between about 30 and about 90 wt % of the total of II) +III) exclusive of said internal surfactant IV)), said acrylic resin II) being polymerized from $\alpha,\beta$-ethylenically unsaturated monomers of which at least about 30 wt % are acrylic monomers, balance, co-monomers, said polyester comprising between about 10 and about 70 wt % of II) +III) exclusive of said internal surfactant IV)).

7. A waterborne composition in accordance with claim 6 wherein between about 1 and about 30 wt % of said α,β-ethylenically unsaturated monomers from which said acrylic resin II) is formed have epoxy functionality.

8. A waterborne composition in accordance with claim 2 wherein between about 1 and about 10 wt % of said α,β-ethylenically unsaturated monomers from which said acrylic resin II) is formed have epoxy functionality and wherein between about 1 and about 10 wt % of said α,β-ethylenically unsaturated monomers from which said acrylic resin II) is formed have amine functionality.

9. A method of sizing textile fibers comprising immersing said fibers in the waterborne composition of claim 2, drying said textile fibers, and heating said textile fibers to a temperature of at least about 110° C.

10. A method of sizing textile fibers comprising immersing said fibers in the waterborne composition of claim 6, drying said textile fibers, and heating said textile fibers to a temperature of at least about 110° C.

11. A polyester formed of monomers comprising i) dibasic carboxylic acids, ii) tribasic carboxylic acids, and iii) diols, at least about 60 wt % of said dibasic carboxylic acids i) having the formula:

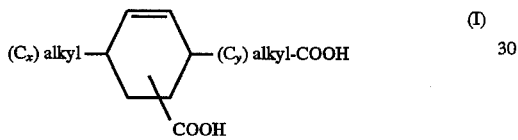

where x =8–32, y=0–8, x+y=8–32, balance other dicarboxylic acids, said diols iii) being provided in an amount relative to said dibasic carboxylic acids i) such that the OH/COOH ratio calculated as the OH content of iii) to the COOH content of i) is between about 1.5 and about 2.5, said tribasic carboxylic acids ii) terminating said polyester, said polyester having an acid number between about 60 and about 280.

12. A waterborne composition comprising I) an aqueous medium containing dispersed particles of II) an acrylic resin and III) the polyester of claim 11, said acrylic resin II) having been emulsion-polymerized in said aqueous medium I) containing said polyester III), said acrylic resin II) comprising between about 30 and about 90 wt % of the total of II)+III), said acrylic resin being polymerized from α,β-ethylenically unsaturated monomers of which at least about 30 wt % are acrylic monomers, balance, co-monomers, said polyester comprising between about 10 and about 70 wt % the total of II)+III), said waterborne composition further comprising surfactant in amounts sufficient to maintain a stable dispersion of said particles in said aqueous medium I).

13. A waterborne composition in accordance with claim 12 wherein between about and about 1 wt % and about 30 wt % of said α,β-ethylenically unsaturated monomers from which said acrylic resin II) is formed have epoxy functionality.

14. A waterborne composition in accordance with claim 12 wherein between about 1 and about 10 wt % of said α,β-ethylenically unsaturated monomers from which said acrylic resin II) is formed have epoxy functionality and wherein between about 1 and about 10 wt % of said α,β-ethylenically unsaturated monomers from which said acrylic resin II) is formed have amine functionality.

15. A polyester/internal surfactant adduct comprising the reaction product of the polyester of claim 11 with an internal surfactant, said internal surfactant comprising between about 55 and about 80 wt % of a polyalkylene oxide chain terminated at one terminus with a hydroxyl group and at the other terminus an alkyl, aryl, or alkylaryl-substituted phenol moiety, which comprises between about 20 and about 45 wt % of said internal surfactant, said polyester comprising between about 70 and about 80 wt % of said adduct and said internal surfactant comprising between about 20 and about 30 wt % of said adduct, said adduct having an acid number between about 50 and about 150.

16. A waterborne composition comprising I) an aqueous medium containing dispersed particles of II) an acrylic resin and III) the polyester of claim 11, said polyester III) being adducted with an internal surfactant IV), said internal surfactant V), said internal surfactant IV) comprising a polyalkylene oxide chain x) terminated at one terminus with a hydroxyl group and at the other terminus an alkyl, aryl, or alkylaryl-substituted phenol moiety xx), said polyalkylene oxide chain x) comprising between about 55 and about 80 wt % of said internal surfactant IV) and said phenol moiety xx) comprising between about 20 and about 45 wt % of said internal surfactant IV), said polyester III) comprising between about 70 and about 80 wt % of said adduct V) of III) and IV) and said internal surfactant IV) comprising between about 20 and about 30 wt % of said adduct V) of III) and IV), said adduct V) of III) and IV) having an acid number between about 50 and about 150, said acrylic resin II) having been emulsion-polymerized in said aqueous medium I) containing said adduct V) of polyester III) and internal surfactant IV), said acrylic resin II) comprising between about 30 and about 90 wt % of the total of II)+III) exclusive of said internal surfactant IV), said acrylic resin II) being polymerized from α,β-ethylenically unsaturated monomers of which at least about 30 wt % are acrylic monomers, balance, co-monomers, said polyester comprising between about 10 and about 70 wt % of II)+III) exclusive of said internal surfactant IV)).

17. A waterborne composition in accordance with claim 16 wherein between about 1 and about 30 wt % of said α,β-ethylenically unsaturated monomers from which said acrylic resin II) is formed have epoxy functionality.

18. A waterborne composition in accordance with claim 12 wherein between about 1 and about 10 wt % of said α,β-ethylenically unsaturated monomers from which said acrylic resin II) is formed have epoxy functionality and wherein between about 1 and about 10 wt % of said α,β-ethylenically unsaturated monomers from which said acrylic resin II) is formed have amine functionality.

19. A method of sizing textile fibers comprising immersing said fibers in the waterborne composition of claim 12, drying said textile fibers, and heating said textile fibers to a temperature of at least about 110° C.

20. A method of sizing textile fibers comprising immersing said fibers in the waterborne composition of claim 16, drying said textile fibers, and heating said textile fibers to a temperature of at least about 110° C.

* * * * *